Dec. 18, 1934.    R. O. DOHM    1,984,966
LAWN MOWER CLUTCH
Filed Feb. 13, 1934

Inventor
R. O. Dohm.
By Thomas H. Johnston
Attorney

Patented Dec. 18, 1934

1,984,966

UNITED STATES PATENT OFFICE 1,984,966

LAWN-MOWER CLUTCH

Robert O. Dohm, Dane, Wis.

Application February 13, 1934, Serial No. 711,079

3 Claims. (Cl. 56—294)

This invention relates to improvements in lawn mowers and more particularly to an improved clutch for driving the cutting reel whereby, when the mower is moved forward, the reel will be revolved in the proper direction while, when the mower is moved backward, the reel may remain at rest.

The invention seeks, among other objects, to provide a clutch which will be directly incorporated in one of the driving pinions of the reel, to the end that the clutch may be of the very simplest construction and the number of parts reduced to a minimum.

A further object of the invention is to provide a clutch which will eliminate the use of separate sleeves and collars, in conjunction with the drive pinion and wherein the function of the clutch will be accomplished through the medium of a pair of simple pins carried by the arbor or shaft of the cutting reel.

And the invention seeks, as a still further object, to provide a clutch which may be easily and quickly assembled upon the reel shaft.

With the foregoing and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1:
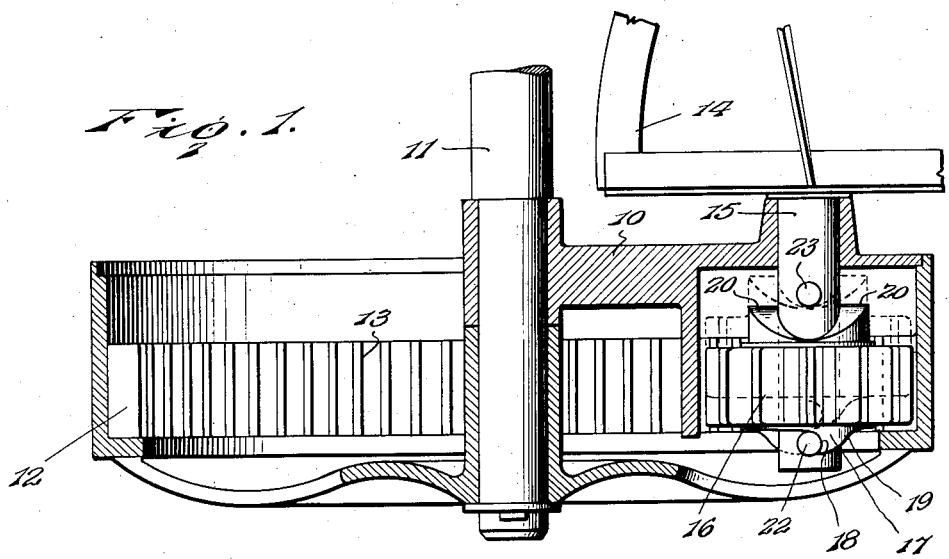
Figure 1 is a horizontal sectional view showing one end of a lawn mower with my improved clutch installed thereon.
Figure 2:
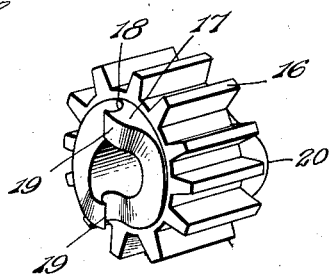
Figure 2 is a perspective view of the driving pinion employed and particularly showing the ratchet teeth at one end of the drive pinion.
Figure 3:
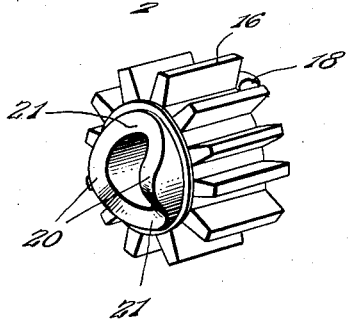
Figure 3 is a perspective view similar to Figure 2 but showing the cams at the opposite end of the drive pinion.

Referring now more particularly to the drawing, I have shown a portion of a lawnmower frame at 10. The frame carries an axle 11 upon which is journaled the ground wheels, one of which is shown at 12, this wheel being provided with the usual internal gear 13. A portion of the cutting reel is indicated at 14, and journaled through the frame 10 is the reel shaft 15. The present improvements are shown in conjunction with one end of the reel shaft but, as will be understood, my improved clutch is, in practical use, preferably employed at each end of the shaft.

In carrying the invention into effect, I employ a driving element 16 for the reel, this driving element being in the form of a pinion which is freely journaled on the shaft 15 to mesh with the internal gear 13 of the wheel 12. Integrally formed on the hub of the pinion 16 at its outer end is a pair of diametrically arranged ratchet teeth 17, each having a concave bearing face 18 and an inclined edge face 19 sloping axially of the pinion. Integrally formed on the hub of the pinion at its opposite end is a pair of diametrically arranged oval cams 20 disposed in a plane at a right angle to the plane of the ratchet teeth 17. Between the cams 20 are alined depressions 21 slightly greater in depth than the maximum height of the ratchet teeth.

Figure 4:
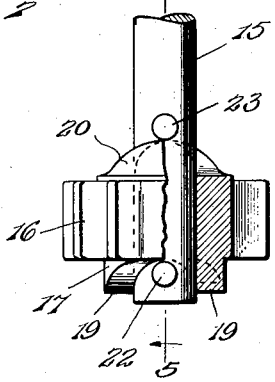
Figure 4 is a detailed plan view partly broken away and shown in section, this view particularly illustrating the manner in which the cams of the pinion are adapted to coact with the inner pin of the reel shaft.
Figure 5:
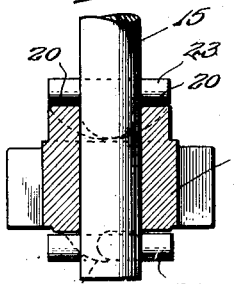
Figure 5 is a sectional view on the line 5—5 of Figure 4.

Driven through the shaft 15 near the outer end thereof is a removable pin 22, the end portions of which are disposed to coact with the ratchet teeth 17, and driven through said shaft in spaced parallel relation to the pin 22 is an identical removable pin 23, the end portions of which are disposed to coact with the cams 20. As particularly seen in Figures 1 and 4 of the drawing, the pins 22 and 23 lie in the same plane and confine the pinion 16 therebetween. Obviously, the construction is such that the pinion and pins may be readily assembled upon the shaft and should either pin become broken, the old pin may be readily driven out and a new pin substituted in lieu thereof.

Assuming now that the pinion 16 is turned forwardly, it will be seen that the pair of cams 20 will coact with the ends of the pin 23 for shifting the pinion 16 outwardly upon the reel shaft 15 until the ends of the ratchet teeth 17 are disposed in the plane of the ends of the pin 22. Accordingly, as the pinion turns, the cupped bearing faces 18 of said teeth will engage the ends of the pin 22, as seen in Figure 1 of the drawing, for turning the reel shaft and rotating the reel 14. Thus, when the mower is moved forward, the reel will be properly revolved. When the mower is moved backward, however, and the pinion 16 is rotated rearwardly, the inclined faces 19 of the ratchet teeth 17 will coact with the ends of the pin 22 for shifting the pinion inwardly upon the shaft 15, when the ends of the pin 23 will be received in the depressions 21 of the pinion. Accordingly, the forward high ends of the ratchet teeth 17 will then clear the ends of the pin 22 so that the pinion may continue to revolve rearwardly. As the rearward motion of the pinion progresses, the pinion will, of course, be again shifted outwardly on the shaft 15, by the cams 20, when the inclined faces 19 of the ratchet teeth 17 will again coact with the ends of the pin 22 for returning the pinion inwardly on the shaft. Thus, as long as the pinion is rotated in a rearward direction, said pinion will be caused to shift axially in and out on the reel shaft but, at any time the motion of the pinion is reversed and said pinion is caused to turn forwardly, the ratchet teeth 17 will, as will be seen, engage the ends of the pin 22 for turning the reel shaft. When the mower is moved forward suddenly and the reel 14 is caused to spin while the mower remains at rest, a vibratory axial movement will similarly be imparted to the pinion 16 but, as will now be appreciated, no separate dogs or pawls are employed such as could jam and suddenly lock the reel or such as would be subjected to excessive wear under the conditions stated.

Figure 6:
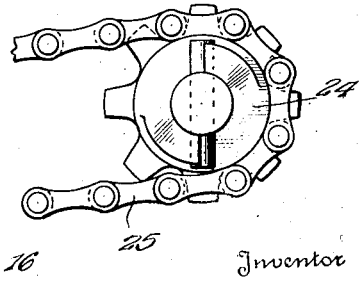
Figure 6 is a detailed elevation of a slight modification and showing the invention embodied in a sprocket.

In Figure 6 of the drawing, I have shown a slight variation of the invention wherein the driving element for the reel is in the form of a sprocket 24 adapted to coact with a sprocket chain 25. The present improvements are well adapted for this form of reel drive and may be used in conjunction with my improved mower shown in my co-pending application filed January 9, 1933, Serial No. 650,882, as well as other mowers using a sprocket drive. Otherwise, this modification is identical with the embodiment of the invention first described and further explanation is accordingly believed unnecessary.

Having thus described my invention, I claim:

1. A drive clutch for the reel shaft of a lawn mover including a shaft, a drive element journaled thereon and shiftable axially of the shaft, spaced pins carried by the shaft and confining said element therebetween, ratchet teeth on one end of said element engageable with one of said pins and having inclined faces to coact with said pin for shifting said element in one direction on the shaft, and spaced cams on the opposite end of said element to coact with the other of said pins for shifting said element in the opposite direction on said shaft.

2. A drive clutch for the reel shaft of a lawn mower including a shaft, spaced parallel pins extending through the shaft, a drive element journaled on the shaft between the pins and shiftable longitudinally of the shaft, a pair of ratchet teeth formed on one end of said element to engage the ends of one of said pins and provided with inclined faces to coact with said pin for shifting said element in one direction on the shaft, and a pair of spaced cams formed on the opposite end of said element to coact with the ends of the other of said pins for shifting said element in the opposite direction on said shaft.

3. A drive clutch for the reel shaft of a lawn mower including a shaft, a pair of spaced pins extending through the shaft, said pins being disposed in the same plane, a rotatable drive element shiftable longitudinally of the shaft between the pins and provided with a hub, a single pair of spaced diametrically arranged ratchet teeth formed on one end of said hub to engage the ends of one of said pins and provided with inclined faces to coact with said pin for shifting said element in one direction on the shaft, and a single pair of diametrically arranged oval cams formed on the opposite end of said hub to coact with the ends of the other of said pins for shifting said element in the opposite direction upon said shaft, said cams being disposed in a plane at a right angle to the plane of said ratchet teeth.

ROBERT O. DOHM. [L. S.]